United States Patent [19]

Wen

[11] Patent Number: 5,526,043
[45] Date of Patent: Jun. 11, 1996

[54] AUTOMATIC VIDEO DISPLAY TESTING AND ADJUSTING SYSTEM

[75] Inventor: Alex Wen, Taipei, Taiwan

[73] Assignee: Lite-On Technology Corporation, Taipei, Taiwan

[21] Appl. No.: 347,082

[22] Filed: Nov. 23, 1994

[51] Int. Cl.⁶ .................................................. H04N 17/04
[52] U.S. Cl. .......................................... 348/190; 348/189
[58] Field of Search .................................. 348/189, 190, 348/184, 180, 199, 177

[56] References Cited

U.S. PATENT DOCUMENTS 4,897,721  1/1990  Young .................................... 348/190

Primary Examiner—Victor R. Kostak
Assistant Examiner—Martha J. Hopkins
Attorney, Agent, or Firm—Browdy and Neimark

[57] ABSTRACT

An automatic video display testing and adjusting system mounted to a CRT video display of a monitor or a TV set is made up a transparent mask, a main circuit board, a computer system which is connected to the main circuit board by a cable, a plurality of adjustable detecting sensor mounting members each having a detecting sensor engaged therewith. The detecting sensors are electrically connected to the main circuit board by wires so that the detected results are able to be fed back to the computer system for analysis and comparison by way of a main computer program. The main circuit board uses interfaces to permit the computer system to communicate with and have control over a tested monitor whereby the main computer program can perform all analytic comparison with set standards and make adjustment automatically on functional discrepancies of the display of a monitor or a TV set.

3 Claims, 6 Drawing Sheets

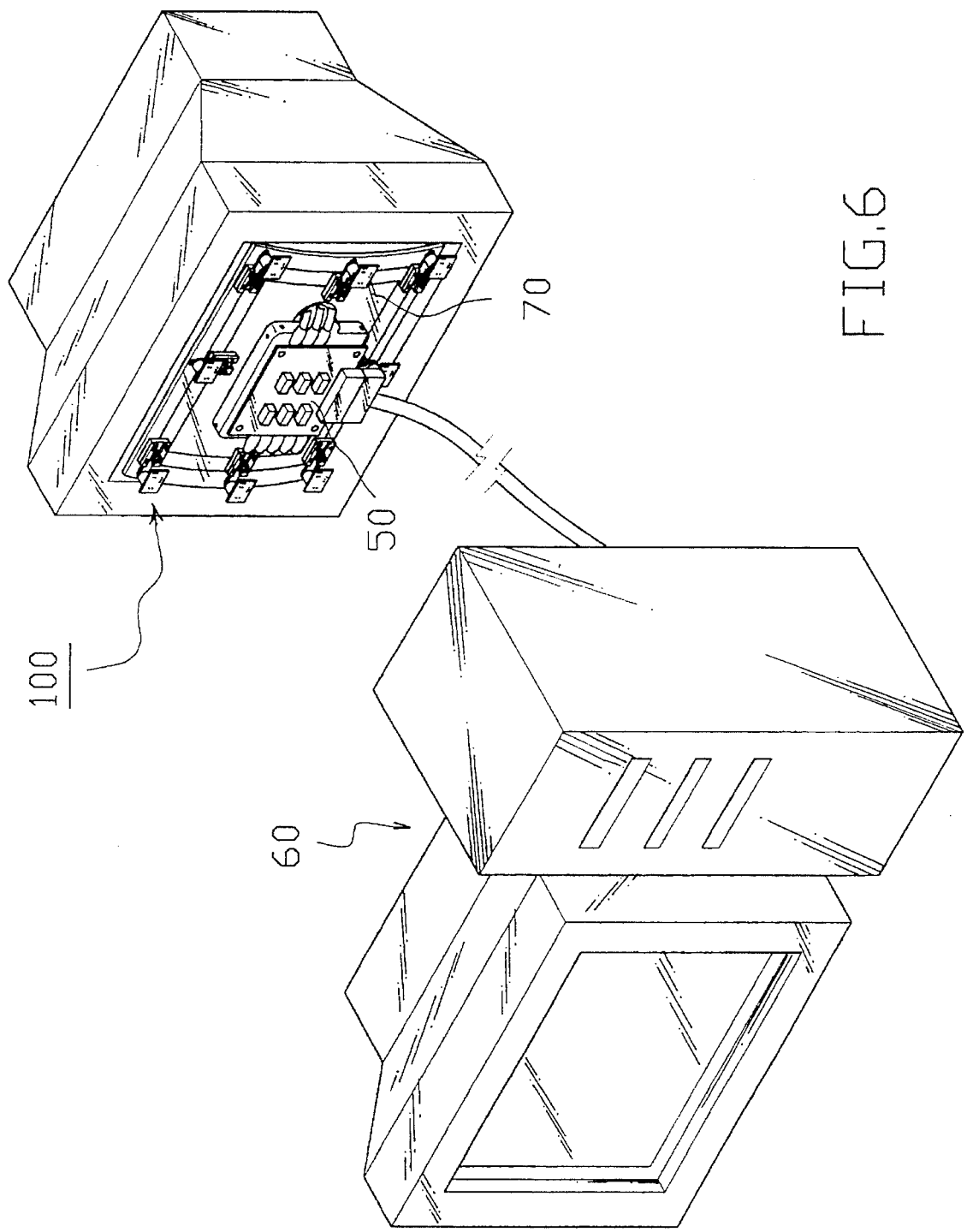

AUTOMATIC VIDEO DISPLAY TESTING AND ADJUSTING SYSTEM

BACKGROUND OF THE INVENTION

The present invention relates to an automatic video display testing and adjusting system adapted for use on moniters or TV sets on a production line. The system is made up of a transparent mask, a main circuit board, a plurality of adjustable sensor mounting members to each of which is secured a sensor, a fixing frame to which the circuit board is secured, a computer system having automatic adjustment programs and file programs. The sensors, such as light-actuated sensors, mounted to the edges of the mask are used to detect the scanning parameters, such as horizontal width, horizontal centering, vertical height and vertical centering, and etc. shown on a tested CRT display of a monitor or a TV set and the inspected results are transmitted to the main circuit board which is electrically connected to the sensors and further coupled to the computer system. The main automatic adjustment program of the computer system is able to operate according to the fedback data by the sensors and to regulate automatically the functional parameters of the CRT display of a tested monitor or TV set.

Generally speaking, CRT displays of newly manufactured monitors or TV sets must be tested and adjustment in particular functions thereof must be made at the same time. To conduct such tests on displays of monitors, a number of geometric diagrams must first be input into monitors so that an operator can check if the diagrams are distorted or not. If the diagrams are distorted, an operator must adjust a number of buttons of variable resistors to vary the horizontal and vertical lines on a monitor until the diagram on a monitor is adjusted into a normal one. All such operations are time consuming and tedious and must be carried out manually.

There have been some new systems developed in recent years that use computer programs to test and adjust functional parameters of tested monitors or TV sets. Those prior art systems using cameras or video cameras to detect or sensor video displays of tested monitors, the systems are relatively bulky and inconvenient to operate in one aspect and the tests and adjustments conducted by those conventional systems are not accurate enough in another aspect.

Functional parameters of displays of monitors or TV sets can be preset according to buyers' requirments and the scanning dimensions on a display can be regulated to be smaller or larger than the actual size of a display if functional features are set in advance.

An operator on a production line is responsible for testing CRT video displays of finished monitors and correcting the discrepancies or errors between set standards and the tested results. The present invention facilitates an operator to perform such tasks automatically and a main computer program is able to take care of all the jobs of testing and adjusting without manual interference as long as the transparent mask is mounted onto a display with all the sensor means accurately placed in position on a tested display.

SUMMARY OF THE INVENTION

Therefore, the primary object of the present invention is to provide a computer operated automatic video display testing and adjusting system which is made up of a plurality of sensor means mounted to the sides of a transparent mask which is attached to a CRT video display of a monitor or a TV set and a main circuit board having interfaces and connected to all the sensor means by wires, and a computer system connected to the main circuit board by cable and having an operation program stored therein whereby a monitor can be tested and adjusted automatically by an operation program.

Another object of the present invention is to provide an automatic video testing and adjusting system which is provided with a transparent mask to which a plurality of adjustable sensor mounting means are mounted each having a sensor and being able to be adjusted to locate the sensors at specific positions for meeting different testing requirements.

BRIEF DESCRIPTION OF THE DRAWINGS

FIG. 6 is a diagram showing a monitor to be tested being engaged with an automatic video display testing and adjusting system of the present invention.

DETAILED DESCRIPTION OF THE PREFERRED EMBODIMENT

Figure 1:
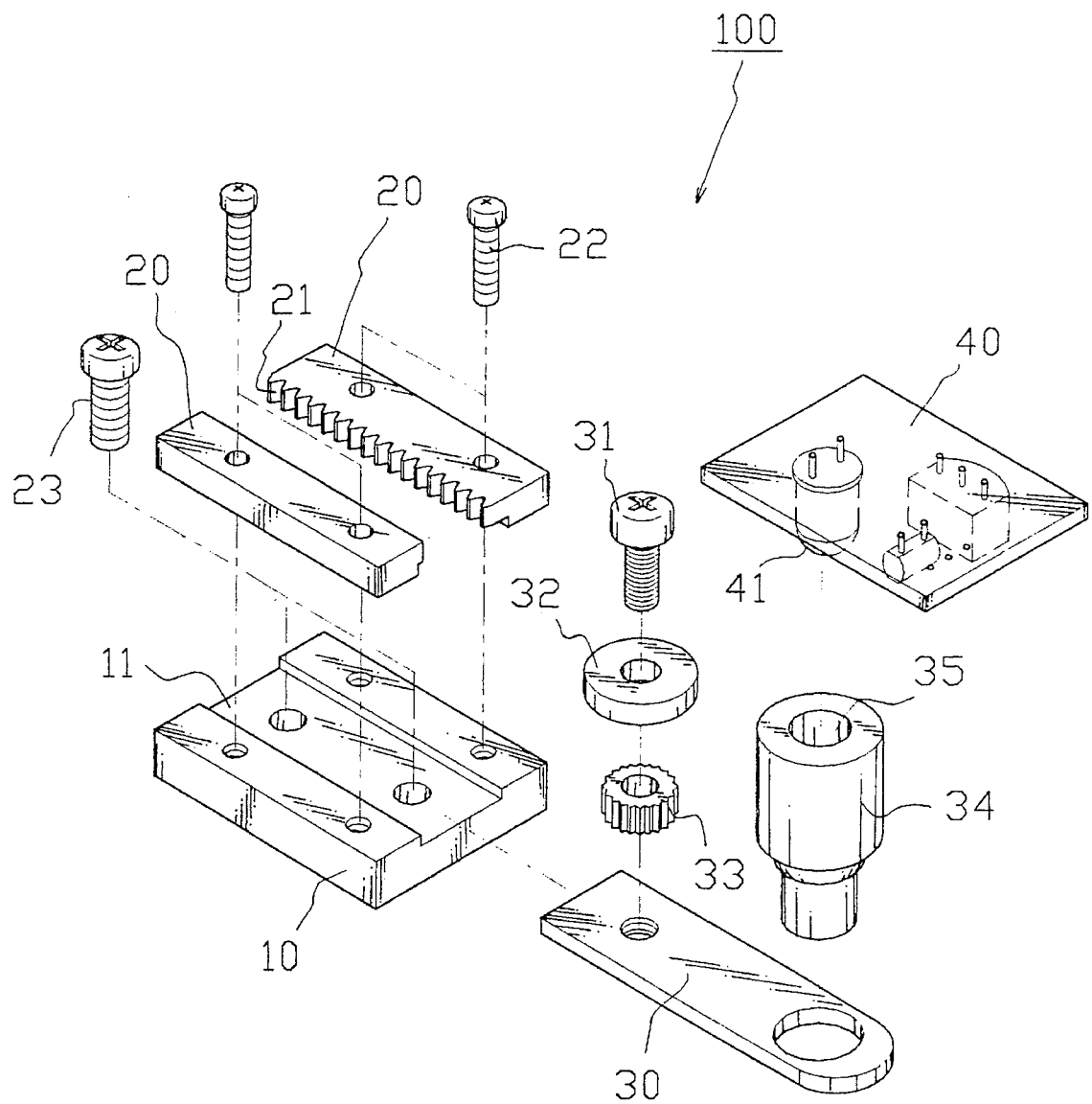
FIG. 1 is a perspective diagram showing exploded components of an adjustable sensor mounting member of the present invention.
Figure 2:
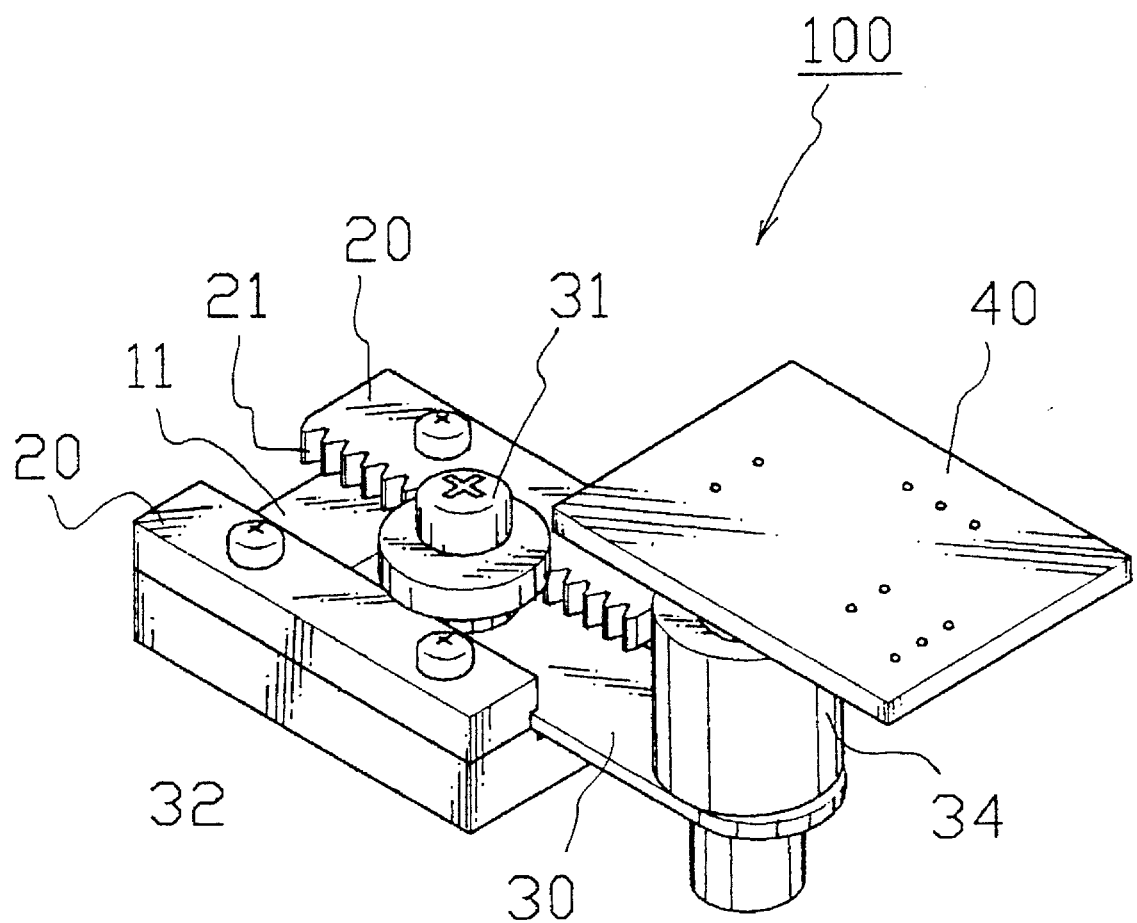
FIG. 2 is a perspective diagram showing the assembly of the adjustable sensor mounting member of the present invention.
Figure 3A:
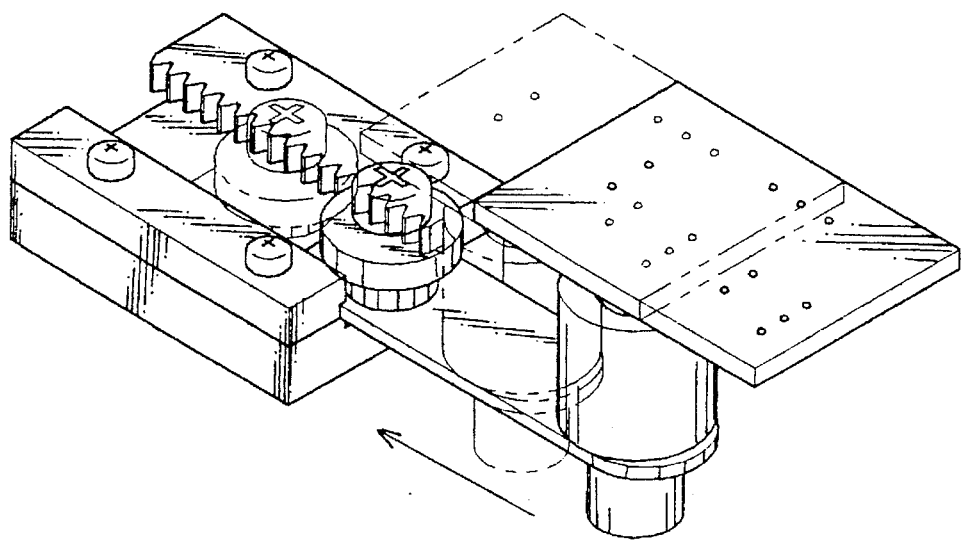
FIGS. 3A, 3B are diagrams showing the directional adjustment of a sensor mounting member thereof.
Figure 3B:
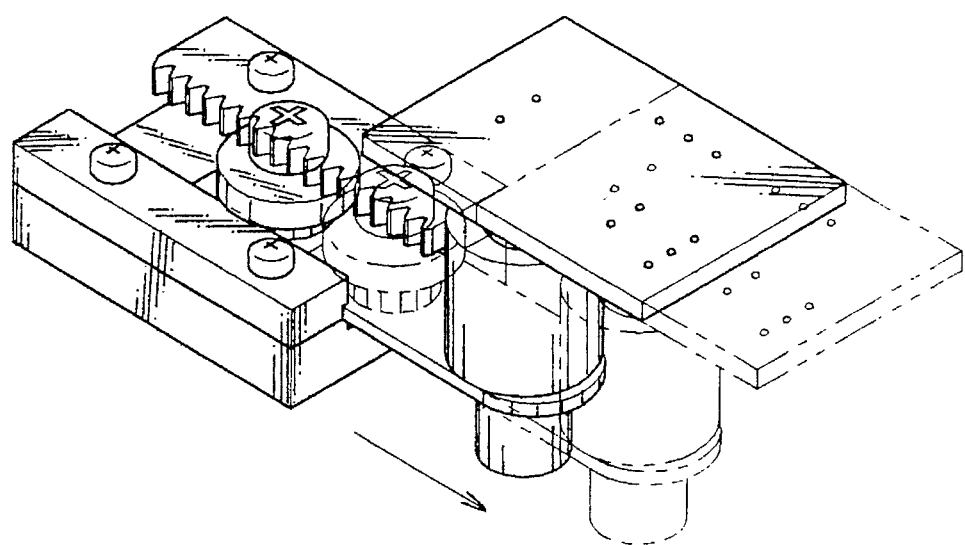

Referring to FIGS. 1, 2, 4 and 6, the present invention relates to an automatic CRT video display testing and adjusting system having a plurality of adjustable sensor mounting members. The system is comprised of a transparent mask 70, a fixing frame having a pair of sucking members 72, a main circuit board 50, and a plurality of sensor mounting device 100 which can be mounted to the edges of a transparent mask 70, and a computer system having a main operation program and file program (not shown). The fixing frame 6 having a pair of sucking members 72 which are led through a pair of through holes 73 of the transparent mask 70 is engaged with the transparent mask 70 so that the transparent mask 70 along with the securing frame 6 to which a main circuit board 50 is fixed can be attached to a video display. The main circuit board 50 is then coupled by a cable to the computer system 60.

Each adjustable sensor mounting member 100 has a sensor means 41 mounted to a minor circuitry board 40 which is electrically connected to the main circuit board 50 for delivery of test data thereto by wire 51.

Each adjusting member 100 of the present invention is comprised of a base 10 having a groove 11 at the longitudinal center thereof and fixed in place by screws 23 to the transparent mask 70, permitting a mounting plate 30 to be slidably engaged therewith. To each side of the base 10 is secured by screws 22 a limiting block 20. One of the limiting blocks 20 has a denticulated side 21. The mounting plate 30 is adjustably moved in the groove 11 and retained in place by the limiting blocks 20 and an adjusting bolt assembly including a bolt 31, a ring 32 and a gear 33 which is engaged with the denticulated side 21 of one of the limiting block 20.

The gear 33 is tightly engaged with the bolt 31 which is secured to the mounting plate 30 so that adjustment of the bolt 31 results in a slide of the mounting plate 30 and variation of position of the sensor 41.

To the opposite end of the mounting plate 30 is disposed a supporting member 34 having a central through hole 35 for receiving a sensor 41 mounted to a minor circuit board 40 connected to the main circuit board 50. The sensor 41 can be a light actuated means or any other types of sensor means.

Figure 4:
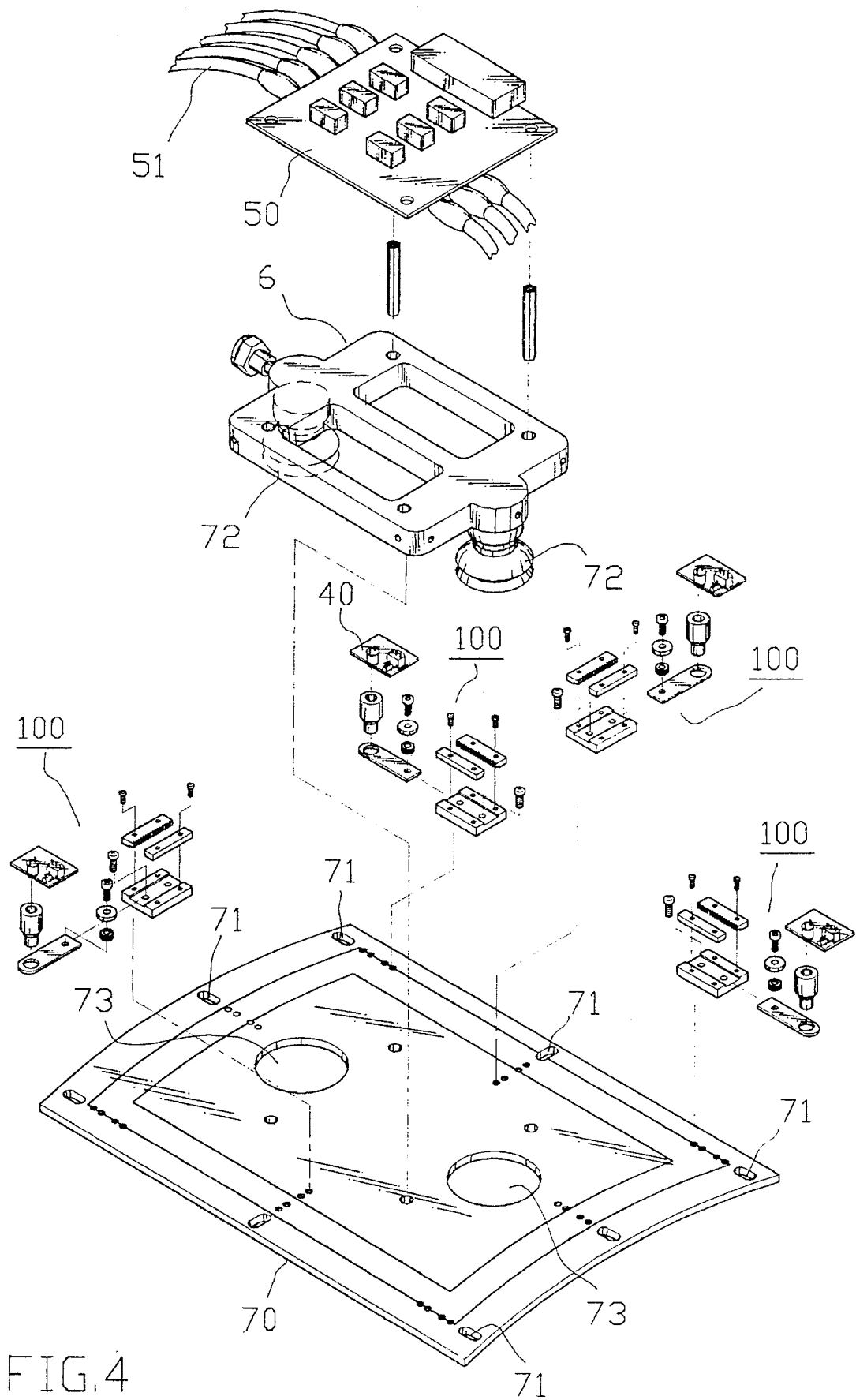
FIG. 4 is a perspective exploded diagram showing the adjustable sensor mounting member being associated with a transparent mask, a securing frame and a main circuit board.
Figure 5:
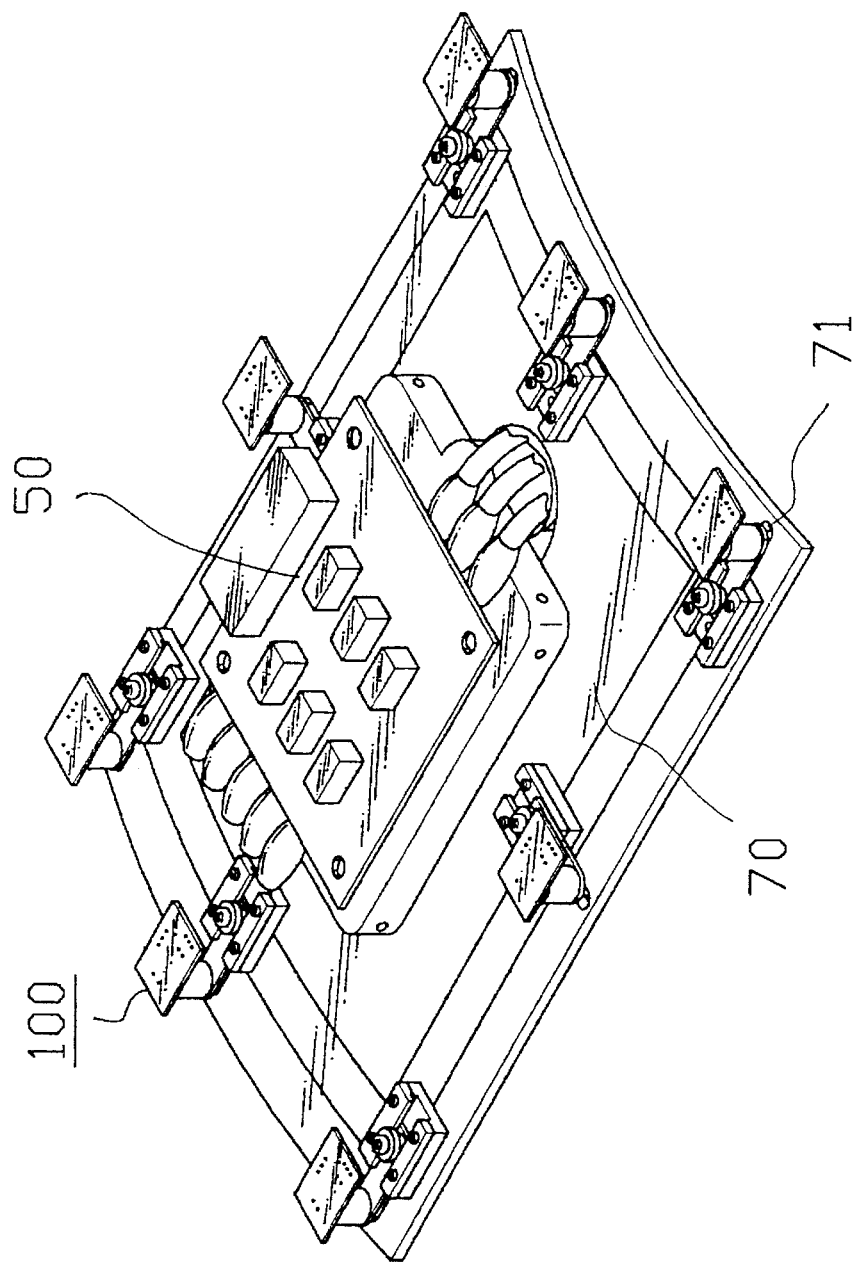
FIG. 5 is a perspective diagram showing the assembly of the adjustable detecting sensor mounting members and the transparent mask and the main circuit board as a whole.

Referring to FIGS. 4, 5, the adjusting devices of the present invention are mounted to four sides of the slightly curved transparent mask 70. At corresponding positions on the edges of the transparent mask 70 are disposed elongated through holes 71 so as to permit the sensor 41 which is connected to the circuit board 40 to be adjustably housed therein. Each adjusting device 100 is fixed to the transparent mask 70 by screws.

The main circuit board 50 connected by a cable to the computer system 60 has interfaces (not shown) which enable the computer system 60 to communicate with and have control over a tested monitor, as shown in FIG. 6 for transmission of detected data to the computer for analysis and making adjustment on functional parameters of a monitor. As further shown in FIG. 6, the whole assembly of the transparent mask 70 can be attached to the viedo display of a monitor by way of the sucking means 72, and the sensor means disposed on the sides of the mask can detect the scanning light on a display in test and the detected information processed by the minor circuitry boards and then sent to the main circuit board having interfaces to communicate with a computer system having a main program to perform data analysis and comparisons and further instruct the tested monitor to make amendment on the operation paramenters thereof automatically.

I claim:

1. An automatic video display testing and adjusting system comprising:

a transparent mask;

a fixing frame having a pair of sucking members being engaged with said transparent mask so as to permit said transparent mask to be attached to a CRT display of a monitor or a TV set;

a main circuit board being secured to said fixing frame;

a computer system having main automatic testing and adjusting programs and file programs;

said main circuit board having interfaces permitting said computer system to communicate with and have control over the monitor or TV set under test;

a plurality of adjustable sensor mounting means secured to the sides of said transparent mask;

each of said adjustable sensor mounting means being equipped with a sensor means mounted to a minor circuit board, said circuit board being electrically connected by a flexible wire to said main circuit board;

each sensor means being housed in a respective elongated opening disposed on edges of said transparent mask so as to permit said sensor means to be adjustably positioned in accordance with various testing requirements;

said elongated opening being disposed adjacent a border of said display and being aligned perpendicularly to said border.

2. An automatic testing and adjusting system comprising:

a transparent mask;

a fixing frame having a pair of sucking members being engaged with said transparent mask so as to permit said transparent mask to be attached to a CRT display of a monitor or a TV set;

a main circuit board being secured to said fixing frame;

a computer system having main automatic testing and adjusting programs and file programs;

said main circuit board having interfaces permitting said computer system to communicate with and have control over the monitor or TV set under test;

a plurality of adjustable sensor mounting means secured to the sides of said transparent mask;

each of said adjustable sensor mounting means being equipped with a sensor means mounted to a minor circuit board, said circuit board being electrically connected by wire to said main circuit board;

each sensor means being housed in an elongated opening disposed on edges of said transparent mask so as to permit said sensor means to be adjustably positioned in accordance with various testing requirements;

wherein said adjustable sensor mounting means is comprised of:

a base;

a groove disposed at the longitudinal center of said base;

a pair of limiting blocks;

each said limiting block being secured to one side of said base by screws;

one of said limiting blocks having a denticulated edge;

a mounting plate being slidably confined in said groove;

an adjusting bolt engaged with a gear with a ring disposed therebetween being fixed to one end of said slidable mounting plate;

a supporting member having a central through hole fixed to a hole at the other end of said slidable mounting plate;

a sensor means being housed in said central through hole and engaged with a minor circuit board which is connected to said main circuit board;

said gear being engaged with said denticulated edge of said limiting block so that the mounting plate can be slidably moved back and forth in a limited distance by actuation of said adjusting bolt, permitting said sensor to be variably positioned.

3. An automatic video display testing and adjusting system as claimed in claim 1 wherein said sensors are light operated sensors.

* * * * *